G. LYSLE, Jr.

AXLE-LUBRICATOR FOR RAILWAY-CARS.

No. 192,337. Patented June 26, 1877.

UNITED STATES PATENT OFFICE.

GEORGE LYSLE, JR., OF PITTSBURG, PENNSYLVANIA.

IMPROVEMENT IN AXLE-LUBRICATORS FOR RAILWAY-CARS.

Specification forming part of Letters Patent No. 192,337, dated June 26, 1877; application filed May 21, 1877.

*To all whom it may concern:*

Be it known that I, GEORGE LYSLE, Jr., of the city of Pittsburg, in the county of Allegheny and State of Pennsylvania, have invented a new and useful Improvement in Axle-Lubricators for Railway-Cars; and I do hereby declare the following to be a full, clear, and exact description thereof, reference being had to the accompanying drawing, forming a part of this specification, in which—

Figure 1:
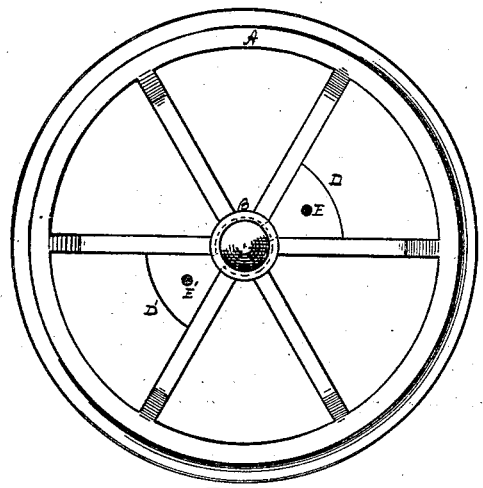
Figure 2:
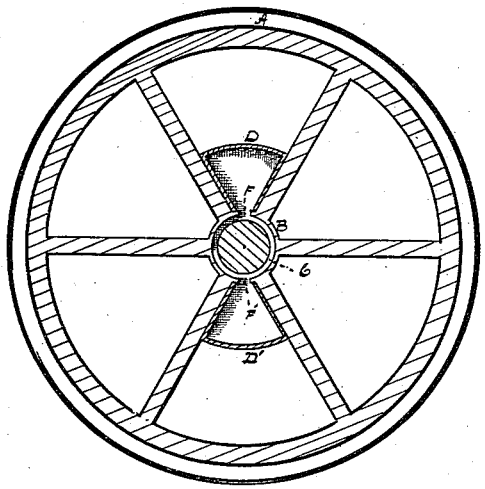

Figure 1 is an elevation of a truck-wheel, showing my improved oil-cup. Fig. 2 is a section of the same.

Like letters refer to like parts wherever they occur.

My invention has for its object an improved oil-cup for truck-wheels; and consists in placing between the spokes of the wheel and around the hub or axle-box an oil-cup which is made in two compartments placed on opposite sides of the hub, and which open directly into a groove in the inside of the hub, which groove connects the two compartments, whereby each compartment will act as a receptacle for the waste oil from the opposite compartment.

Heretofore various devices have been used for oiling the bearing parts of the axles of trucks, and, in general, packing has been used to retain the oil and to apply it evenly to the parts where it is needed. My improved oil-cup dispenses with all packing, as the groove before mentioned in the hub of the wheel retains the oil and applies it to the axle as it is needed.

I will now describe my invention, so that others skilled in the art to which it appertains may manufacture and use the same.

A is the truck-wheel, made after any of the usual patterns. B is the axle-box or hub, provided with a groove or recess, C, into which recess the compartments D D' of the oil-cup open through the holes F F'. These compartments D D' may be made part of the wheel, or they may be made separately and afterward fastened between the spokes opening into and on opposite sides of the hub B.

E E' are openings in the compartments D D', through which the oil is fed into the oil-cup. These openings are placed at or near the center of the side of the compartments, so that the oil will not escape as the wheel turns round, there not being sufficient oil in the cup to fill it up to the level of the openings in any position which the compartments may assume by the revolution of the wheel.

The oil passing from one compartment to the other through the groove or recess C, as the wheel turns, keeps the axle covered with oil, thus dispensing with the packing which is generally used for that purpose.

I am aware that two or duplicate oil-chambers have been placed on opposite sides of a hub and connected with a passage leading thereto, each chamber being an independent oil-cup and guarded by a perforated diaphragm, so that a limited supply of oil was trapped out of the oil cup or cups at each revolution of the wheel, and do not herein claim such subject-matter; but,

Having thus described my invention, what I claim, and desire to secure by Letters Patent, is—

In combination with a truck-wheel, an oil-cup divided into two compartments placed against and on opposite sides of the hub and connected by a groove inside of the hub, into which the said compartments open directly, substantially as and for the purpose described.

In testimony whereof I, the said GEORGE LYSLE, Jr., of the city, county, and State aforesaid, have hereunto set my hand.

GEORGE LYSLE, JR.

Witnesses:
JAMES I. KAY,
JNO. K. SMITH.